3,088,915
RESTORATION OF DECOMPOSED AND POLYMERIZED HEAT TRANSFER FLUIDS
Hugh Frederick Payne and Eric Beanland, London, England, assignors to Hygrotherm Engineering Limited, London, England
No Drawing. Filed Oct. 10, 1960, Ser. No. 61,337
Claims priority, application Great Britain Nov. 16, 1959
3 Claims. (Cl. 252—78)

The object of this invention is a process of restoring normal fluidity to decomposed and polymerized heat transfer mediums and the product thereof.

Heat transfer media containing tetra-aryl ortho-silicates are well known and have been in use on an extensive scale for many years. They are constituted in part by tetra-aryl silicates prepared so as to be liquid at room temperature, and in part by condensed aryl silicates, that is to say, aryl esters of polysilicic acids. In the former case, the desired liquidity at room temperature, which is necessary to avoid solidification of the medium in the entire heat transfer system on shutting down, is generally obtained by mixing two or more different tetra-aryl silicates or by using mixed tetra-aryl silicates. Because of the transesterification which takes place during use at elevated temperatures, these two alternatives give precisely the same result. During use at an elevated temperature, even when oxygen is rigorously excluded, a progressive deterioration takes place, caused to a large extent by progressive condensation of the silicic acid residues leading to the production of molecules of relatively large molecular weight with a concomitant increase in the viscosity of the medium both at room temperature and at the operating temperature. In the past, is has been the practice to replace losses with fresh liquid of the same composition as that originally charged into the system. In addition to making good the losses, this has the advantage of reducing the viscosity of the charge. It has also been the practice to replace the liquid in the system either wholly or in part by fresh material of the same composition as required to maintain the viscosity of the liquid at a satisfactory level.

In the production of fresh heat transfer medium it has, as already mentioned, been the practice either to manufacture a condensed tetra-aryl silicate, for example, by controlled hydrolysis of an ortho tetra-silicate followed by stripping a low-boiling material including unconverted monomer, or by effecting transesterification with a commercially available condensed alkyl silicate such as "ethyl silicate 40," or to prepare a mixed tetra-aryl ortho silicate or mixture of tetra-aryl ortho silicates generally including a proportion of tetra phenyl silicate.

It has already been proposed to prepare a heat transfer medium by admixing tetra phenyl silicate with a special organo silicon compound obtained from silicon oxychlorides, which to some extent resembles a condensed aryl silicate. We have discovered that equally suitable compositions can be produced at greatly reduced cost by admixing tetra-phenyl silicate with a condensed aryl silicate which has been obtained as already described, namely by the thermal decomposition of any aryl ortho silicate, or by the controlled hydrolysis of a tetra-aryl silicate, or by transesterification with a condensed alkyl silicate.

In particular, we have discovered that the preparation of a heat transfer medium as just described can be carried out in conjunction with the operation of a pre-existing heat transfer installation using a heat transfer medium of the type referred to, comprising adding tetra-phenyl silicate itself instead of the parent heat transfer medium for the purpose of reducing the viscosity of the medium from time to time to counteract progressive thermal decomposition. It is remarkable that this use of tetra-phenyl silicate which is a solid, will generally give rise to a greater decrease in the viscosity of the aged heat transfer medium than will the addition of a corresponding portion of the fresh, liquid heat transfer medium itself. Moreover, the thermal stability of the mixture so produced is generally better than if the fresh, parent heat transfer medium is used. This applies whether the parent heat transfer medium is a tetra ortho silicate composition or a condensed aryl silicate composition.

In another aspect, this invention consists in a method of operating a heat transfer installation employing a heat transfer medium of the type referred to, which comprises adding tetra-phenyl silicate to the heat transfer medium from time to time to maintain the viscosity at a predetermined temperature below a predetermined maximum.

Thus, the heat transfer medium will, in general, be sampled periodically and the viscosity of the sample determined, and an addition tetra phenyl silicate made where the viscosity so determined exceeds the corresponding maximum desired.

This invention also consists in a method of operating a heat transfer installation as aforesaid which comprises periodically determing the quantity of heat transfer medium remaining in the installation, estimating the amount of medium which has been lost, determining the viscosity of the medium at a predetermined temperature and ascertaining therefore the rise in viscosity which has taken place since the previous check, adding tetra phenyl silicate to reduce the viscosity to a desired level, and also adding fresh parent heat transfer fluid where the loss from the system exceeds the amount of tetra phenyl silicate it is desired to add.

By operating in accordance with this invention, it is to be anticipated that, instead of having to discard the aged transfer medium from a system when deterioration, the medium can be kept in useful operating condition for many times its present life.

The amount of tetra phenyl silicate to be added may be as great or greater than the amount of aged or condensed aryl silicate. In one example, a sample of heat transfer fluid sold under the trade name TAS 190 (comprising essentially a mixed phenyl resorcinyl silicate in which the molar ratio of phenol to resorcinol groups is 3.64 to 0.36) had deteriorated in use until its viscosity was 5,540 centistokes measured at 25° C. The addition of an equal weight of tetra phenyl silicate reduced its viscosity to 145 centistokes at 25° C., although the tetra phenyl silicate itself was solid.

We claim:
1. A process of lowering the viscosity and melting point of a thermally polymerized and decomposed originally normally liquid heat transfer medium containing originally a liquid tetra-aryl ortho-silicate, comprising mixing tetra-phenyl ortho-silicate into the decomposed medium in quantities sufficient to restore it to a useful lowered viscosity and melting point.

2. A heat transfer liquid consisting of a decomposed and polymerized heat transfer medium originally liquid and containing a tetra-aryl ortho-silicate and tetra-phenyl silicate.

3. A heat transfer medium as defined in claim 2, wherein the ingredients are in equal parts.

References Cited in the file of this patent

UNITED STATES PATENTS

| | | |
|---|---|---|
| 2,335,012 | Johnston | Nov. 23, 1943 |

FOREIGN PATENTS

| | | |
|---|---|---|
| 145,667 | Australia | Mar. 10, 1952 |
| 727,294 | Great Britain | Mar. 30, 1955 |